United States Patent [19]
Elspass et al.

[11] Patent Number: 6,034,164
[45] Date of Patent: Mar. 7, 2000

[54] NANOCOMPOSITE MATERIALS FORMED FROM INORGANIC LAYERED MATERIALS DISPERSED IN A POLYMER MATRIX

[75] Inventors: Chester W. Elspass, Alpha; Dennis George Peiffer, Annandale, both of N.J.

[73] Assignee: Exxon Research and Engineering Co., Florham Park, N.J.

[21] Appl. No.: 09/187,872

[22] Filed: Nov. 6, 1998

Related U.S. Application Data

[63] Continuation-in-part of application No. 08/804,021, Feb. 21, 1997, abandoned.

[51] Int. Cl.[7] .............................. C08K 3/34; C08K 3/10
[52] U.S. Cl. ....................... 524/445; 523/209; 523/216; 524/447; 524/449; 524/451
[58] Field of Search .................... 523/209, 216; 524/445, 447, 449, 451

[56] References Cited

U.S. PATENT DOCUMENTS

| | | | |
|---|---|---|---|
| 4,810,734 | 3/1989 | Kawasumi et al. | 523/216 |
| 4,889,885 | 12/1989 | Usuki et al. | 524/445 |
| 5,539,015 | 7/1996 | Horii et al. | 524/445 |
| 5,552,469 | 9/1996 | Beall et al. | 524/445 |
| 5,576,372 | 11/1996 | Kresge et al. | 524/445 |
| 5,576,373 | 11/1996 | Kresge et al. | 524/445 |
| 5,578,672 | 11/1996 | Beall et al. | 524/446 |
| 5,665,183 | 9/1997 | Kresge et al. | 524/445 |

FOREIGN PATENT DOCUMENTS

WO93/04118  3/1993  WIPO .............................. C08K 9/04

*Primary Examiner*—Peter A. Szekely
*Attorney, Agent, or Firm*—Gerald J. Hughes; Linda M. Scuorzo

[57] ABSTRACT

A polymer nanocomposite composition having sufficiently low air permeability to be usefull as a tire inner liner, among other things, is prepared by blending a layered material with a metal processible non-ionic first polymer having a number average molecular weight greater than 50,000 g/mole and a second non-ionic polymer compatible with the first polymer and having a number average molecular weight less than that of the first polymer.

6 Claims, No Drawings

NANOCOMPOSITE MATERIALS FORMED FROM INORGANIC LAYERED MATERIALS DISPERSED IN A POLYMER MATRIX

This application is a Continuation-in-Part of U.S. Ser. No. 804,021 filed Feb. 21, 1997, now abandoned.

FIELD OF THE INVENTION

This invention relates generally to the field of polymer compositions and more particularly to polymer compositions having a layered material dispersed therein.

BACKGROUND OF THE INVENTION

Recently there has been considerable interest in forming composite materials consisting of a polymer matrix having an exfoliated layered material dispersed in the polymer matrix.

One approach to forming such composites involves polymerizing a monomer in the presence of layered material pre-treated with a swelling agent (see U.S. Pat. No. 4,810,734 and U.S. Pat. No. 4,889,885).

In PCT published application WO 93/04118 a process is disclosed for forming a polymeric nanocomposites using a melt-processable polymer and a swellable and polymer compatible intercalated layer material. Although the publication discloses compatibilizing agents suitable for use with polymers such as polyolefms, polyesters and polyamides no procedure is disclosed for predicting the utility of a compatibilizing agent with other classes of polymers.

In U.S. Pat. No. 5,552,469 an intercalate capable of being exfoliated in a polymer matrix is disclosed. The intercalate consists of a layered material swelled by water and a water soluble polymer.

U.S. Pat. No. 5,576,372 and U.S. Pat. No. 5,576,373 disclose a nanocomposite comprising a rubber which has a positively charged group, and a layered silicate that has a negative charge on the silicate whereby the negative charge on the silicate is connected to the positive charge on the reactive rubber through ionic bonding or association thereby overcoming the bonding force between the layers of the silicate resulting in their separation. Nonionic (charge neutral) polymers are not taught.

U.S. Pat. No. 4,889,885 discloses nanocomposites comprising certain resins and a layered silicate dispersed therein, said layered silicate having a layer thickness of 7–12 Å and an interlayer distance of 30 Å or above. Based on the x-ray diffraction data the compositions are entirely exfoliated.

Notwithstanding the foregoing, practical application of nanocomposite materials appears at best to be very limited. Research has therefore been effected to incorporate layered minerals in a polymer matrix in such a way as to provide a material with improved properties. Applicants' invention addresses these needs.

SUMMARY OF THE INVENTION

Surprisingly, it has been found that a polymer composition having sufficiently low air permeability to be useful as a tire inner liner, among other things, can be prepared by blending a layered material with a melt processable first polymer having a number average molecular weight greater than 50,000 g/mole and a second polymer compatible with the first polymer and having a number average molecular weight less than that of the first polymer.

Thus, in one embodiment of the present invention there is provided a polymer composition which based on the total weight of the composition comprises:

1.0 to 25 wt % of a layered silicate, preferably modified with a swelling agent;

45 to 98.5 wt % of a melt processable first polymer having a number average molecular weight greater than 50,000 g/mole; and 0.5 to 30 wt % of a second polymer, the second polymer being compatible with the first polymer and having a number average molecular weight less than that of the first polymer.

In a particularly preferred embodiment, the layered silicate is in the form of packets (i.e., contains silicate layers aggregated together) having an average thickness of from about 50 Å to about 1400 Å (such layer aggregates are referred to herein as packets). Other embodiments of the invention will become apparent upon a reading of the detailed description which follows.

DETAILED DESCRIPTION OF THE INVENTION

The composition of the present invention has a polymer matrix of a first and second polymer and a layered material dispersed therein. The polymers are charge neutral (i.e., non-ionic).

The first polymer is a melt processable, non-crystalline, elastomer such as natural rubber, polyisoprene, polybutadiene, styrene-butadiene copolymers, copolymers of isobutylene and isoprene, functionalized copolymers of isobutylene and isoprene, copolymers of isobutylene and paramethyl styrene, and copolymers of isobutylene and a functionalized paramethyl styrene to mention a few. Preferably the isobutylene containing copolymers will contain about 90 wt % of the isobutylene monomer.

In the case where the elastomer is an isobutylene-isoprene copolymer, the copolymer is typically functionalized with a halo group such as chlorine, bromine, iodine, a methacrylic, sulfonic, anhydride, ainine, ethylene oxide, (i.e., maleic or succinic anhydride) group or mixture of groups. In general the functional group will be covalently bonded to the isoprene moiety of the copolymer. In the present invention, it is particularly preferred that the isobutylene-isoprene copolymer be an isobutylene bromo isoprene copolymer.

In the case where the elastomer is a functionalized paramethyl styrene containing copolymer the methyl group will be functionalized typically with a halo group such as chloro, bromo or iodo group and preferably bromo.

Typically the first polymer will have a polydispersity of from about 1.5 to about 12. Importantly, the first polymer will have a number average molecular weight greater than 50,000 g/mole and typically from 50,000 g/mole to about $2 \times 10^6$ g/mole.

In general, the first polymer will be present in the composition in the range of about 45 to about 98.5 wt %.

The second polymer is chosen from polymers having a number average molecular weight lower than the first polymer and which are compatible (i.e., miscible) with the first polymer. Especially preferred second polymers are polymers based on the same monomers as those of the first polymer. Typically the second polymer will have a number average molecular weight from about 500 to about 50,000 g/mole.

The second polymer will be present in the composition in amounts ranging from about 0.5 to 30 wt %.

Layered materials useful in the present invention are any swellable layered structures capable of being intercalated and having an individual layer thickness of from 0.01 to 20 nanometers and a diameter of from 0.05 to 10 microns. Included are natural and synthetic minerals that have at least some cation exchange capacity such as smectic clay, montmorillonite, hectorite, vermiculite, sapponite, hallocite, stevensite, beidellite, kaolinite, hydrotalcite, and layered aluminate oxides. Indeed these clay minerals are known to have a cation exchange capacity typically in the range of about 10 to 150 milli-equivalents per 100 grams. Of these, montmorillonite and hectorite are preferred.

As is known, such layered minerals can be modified with swelling agents such as hydrocarbyl onium salts by contacting the layered mineral with the swelling agent in an appropriate liquid dispersant. Suitable liquid dispersants include water, alcohol, hydrocarbons and mixtures thereof. Preferred onium salts are represented by the formula $A^-M^+R^1R^2R^3R^4$ and $A^-Py^+R^4$, where $A^-$ denotes an anion such as OH—, and NO—$_3$, SO—$_4$, Cl—, Br—and the like; M denotes N, S or P; $R^1$, $R^2$, $R^3$, $R^4$ independently denote hydrogen, alkyl, and allyl groups having 1 to 40 carbon atoms and aryl groups; Py denotes the pyridinium or an alkyl substituted pyridinium group in which the alkyl group has 1 to 30 carbon atoms.

The amount of the swelling agent useful in aiding in the formation and dispersion of packets of materials is in the range of 10 to 1000% of the weight of the layered material and preferably from about 20 to 70% of the weight of the layered material depending upon the intended use of the composite. Suffice it to say, however, that the amount of layered material combined with the polymer matrix material will be sufficient to provide the advantages of this invention. Typically, the lower amount of layered material will be about 0.1% by weight of the composite (nanocomposite). Typically the upper amount of the layered material employed will be no greater than about 40% of the weight of the composite. Preferably, the amount of layered material will be from 1 wt % to 20 wt % based on the weight of the composite.

The modified layered material and the first and second polymer typically are blended in a melt in a suitable mixer. Importantly, the polymer and modified layered material are mixed under mixing conditions sufficient to form packets of the layered material having an average thickness from about 50 Å to about 1400 Å thick. Indeed, it is especially preferred that about 80 vol % of the layered material have a sufficient number of layers to form packet of those layers having a thickness greater than about 100 Å. The amount of mixing energy used to achieve the requisite dispersion is characterized as moderate and is achieved in a Banbury or Brabender mixer and by extrusion and calendering, for example. Importantly, high shear which typically results in substantial exfoliation of the layered material is to be avoided. Complete exfoliation (i.e., absence) of layers is evidenced by the a peak attributable to the (001), i.e., basal, plane of the material as measured by x-ray diffractometry. Thus a fully exfoliated material would not evidence basal plane scattering when subjected to x-ray difractometry. The modified layered materials of the present invention do show such x-ray scattering, indicating the presence of intact layers. To determine whether a given mixing condition is sufficient sample runs can be made and the average thickness of the layered material can be determined by techniques such as transmission electron microscopy (TEM) or small angle x-ray scattering.

The nanocomposite material of the present invention can be used as is in the formation pneumatic tires having tire liners, for inner tubes, bladders and for other substantially air impermeable membranes.

EXAMPLE 1

5 g of a dialkylammonium modified montmorillonite clay, 2.75 g brominated isobutylene-paramethylstyrene copolymer (number average molecular weight=70,000 g mole$^{-1}$) and 47.3 g brominated isobutylene-paramethylstyrene copolymer (number average molecular weight=300,000 g mole$^{-1}$) were melt mixed in a Brabender melt mixer at 165° C. for 5 minutes. The average thickness of the clay packets in the composite was found to be 265 Å with 99.9 vol % of the packets greater than 100 Å. Additionally, 20 mil films were compression molded at 165° C. Oxygen transmission of films were measured on a Mocon 2/20. Uniaxial tensile properties of 1-inch dumbbells were measured at 20 inches per minute on an Instron tensile tester.

Control samples were also prepared as described above, except Comparative Example 1 contains no clay mineral, and Comparative 2 contains unmodified sodium montmorillonite. Both have high and low molecular weight polymer. Results are presented in Table 1 and Table 2.

TABLE 1

Permeability Data

| Film | Oxygen Transmission * ($cm^3$ × mils/$m^2$ × 24 hours) |
|---|---|
| Example 1 | 3,400 |
| Comparative Example 1 | 4,300 |
| Comparative Example 2 | 4,400 |

* Mocon 2/20; 30° C.

TABLE 2

Stress-Strain Measurements

| Film | Stress at Peak (PSI) | Strain (%) at Break | Energy at Break (in lbs.) | 100% Modulus (PSI) | 300% Modulus (PSI) |
|---|---|---|---|---|---|
| Example 1 | 91.4 | 1659 | 2.1 | 85.8 | 85.8 |
| Comparative Example 1 | 61.4 | 1377 | 1.9 | 52.4 | 60.3 |
| Comparative Example 2 | 68.8 | 1391 | 1.5 | 68.3 | 63.1 |

EXAMPLE 2

Initially, 12 g of a dialkyl-ammonium montmorillonite clay, and 8 g of a low molecular weight polybutadiene, obtained from Aldrich Chemical Company, Inc., Milwaukee, Wis., (number average molecular weight=5000 g/mol), were combined manually with a spatula, and heat treated at 70° C. for 36 hours without agitation to form a clay-polymer paste. 15 g of this polymer paste and 40 g cis-1,4 polybutadiene (number average molecular weight=45) were mixed in a Brabender Mixer at 100 rpm for 10 minutes at 130° C. Then a crosslinking package consisting of 3 phr zinc oxide, 2 phr stearic acid, 3.5 phr sulfur and 0.25 g Altax accelerator (sold by R. T. Vanderbuilt Company, Inc., Norwalk, Conn.) were added to the Brabender at 80° C. and mixed for 3 minutes. The average thickness of the clay packets in the composite was found to be 111 Å with 99.7 vol % greater than 100 Å thick. Subsequently, 25 mil films were prepared by compression molding at 165° C. for 90 minutes. Nano-composite films (Example 2) and films prepared in an identical manner, i.e., having no clay or low molecular weight polymer components (Comparative Example 2) were tested for oxygen transmission on a Mocon 2/20. In addition, uniaxial tensile properties as measured on an Instron tester at a crosshead speed of 20 inches per minute were obtained. These results are shown in Tables 3 and 4, respectively.

TABLE 3

Permeability Data

| Film | Clay, wt % | Oxygen Transmission * ($cm^3$ × mils/$m^2$ × 24 hours) |
|---|---|---|
| Comparative Example 2 | 0 | 202,000 |
| Example 2 | 9.0 | 54,150 |

* Mocon 2/20; 30° C.

TABLE 4

Mechanical Property Results

| Film | Tensile Strength (PSI) | Tensile Strain % | 100% Modulus (PSI) | 300% Modulus (PSI) | Energy at Break in lbs/$in^3$ |
|---|---|---|---|---|---|
| Example 2 | 1050 | 419 | 542 | 747 | 2.9 |
| Comparative Example 2 | 545 | 1120 | 84.4 | 112 | 2.7 |

What is claimed is:

1. A nanocomposite composition comprising:

a layered natural or synthetic mineral dispersed in a blend of a first non-ionic polymer having a first number average molecular weight greater than 50,000 g/mole and a second non-ionic polymer compatible with the first polymer and having a second number average molecular weight less than the first number average molecular weight;

wherein the first polymer and the second polymer are selected from the group consisting of natural rubber, polyisoprene, polybutadiene, styrene-butadiene copolymers, copolymers of isobutylene and isoprene, halo-functionalized copolymers of isobutylene and isoprene, copolymers of isobutylene and paramethyl styrene and copolymers of isobutylene and para-halo functionalized methyl styrene;

wherein the layered mineral contains an onium salt represented by the formula $A^-M^+R^1R^2R^3R^4$ and $A^-Py^+R^4$, wherein $A^-$ is an anion selected from the group consisting of OH-, $NO^-_3$, $SO^-_4$, Cl-, and Br-; M is selected from the group consisting of N, S and P; $R^1$, $R^2$, $R^3$, and $R^4$ are independently selected from the group consisting of hydrogen, alkyl, and allyl groups, the alkyl, allyl, and aryl groups having 1 to 40 carbon atoms; Py is pyridinium or an alkyl substituted pyridinium group in which the alkyl group has 1 to 30 carbon atoms;

wherein the onium salt is present in an amount ranging from about 10 wt % to about 1000 wt % based on the weight of the layered mineral, and wherein the amount of layered mineral ranges from about 0.1 to about 40 wt % based on the weight of the composition.

2. A nanocomposite compensation comprising:

a layered natural or synthetic mineral dispersed in a blend of a first non-ionic polymer having a first number average molecular weight greater than 50,000 g/mole and a second non-ionic polymer compatible with the first polymer and having a second number average molecular weight less than the first number average molecular weight;

wherein the first polymer and the second polymer are selected from the group consisting of natural rubber, polyisoprene, polybutadiene, styrene-butadiene copolymers, copolymers of isobutylene and isoprene, halofunctionalized copolymers of isobutylene and isoprene, copolymers of isobutylene and paramethyl styrene and copolymers of isobutlene and para-halo functionalized methyl styrene;

wherein the layered mineral contains an onium salt represented by the formula $A^-M^+R^1R^2R^3R^4$ and $A^-Py^+R^4$, wherein $A^-$ is an anion selected from the group consisting of OH—, $NO^-_3$, $SO^-_4$, Cl—, and Br—, M is selected from the group consisting of N, S and P; $R^1$, $R^2$, $R^3$, and $R^4$ are independently selected from the group consisting of hydrogen, alkyl, and allyl groups, the alkyl, allyl, and aryl groups having 1 to 40 carbon atoms; Py is pyridinium or an alkyl substituted pyridinium group in which the alkyl group has 1 to 30 carbon atoms; and wherein the layered material is present in an amount from 1.0 to 25 wt % based on the total weight of the composition;

wherein the onium salt is present in an amount ranging from about 10 wt % to about 1000 wt % based on the weight of the layered mineral, and wherein the amount of layered mineral ranges from about 0.1 to about 40 wt % based on the weight of the composition.

3. The composition of claim 2 wherein the first polymer is present in an amount between 45 to 98.5 wt % based on the total weight of the composition.

4. The composition of claim 2 wherein the second polymer is present in an amount of 0.5 to 20 based on the total weight of the composition.

5. The composition of claim 4 wherein the layered material is in the form of packets having an average thickness of from 100 Å to 1400 Å.

6. A substantially air impermeable elastomer membrane comprising:

a blend of a first non-ionic polymer, a second non-ionic polymer and a layered natural or synthetic mineral, the first polymer having a first number average molecular weight greater than 50,000 g/mole and a second polymer being compatible with the first polymer and having a second number average molecular weight less than the first number average molecular weight, the first polymer and second polymer being selected from the group consisting of natural rubber, polyisoprene, polybutadiene, styrene-butadiene copolymers, copolymers of isobutylene and isoprene, halo functionalized copolymers of isobutylene and isoprene, copolymers of isobutylene and paramethyl styrene and copolymers of isobutylene and para-halo functionalized methyl styrene, the layered mineral being dispersed in the blend in the form of packets having an average thickness of from 100 Å to 1400 Å;

wherein the layered mineral contains an onium salt represented by the formula $A^-M^+R^1R^2R^3R^4$ and $A^-Py^+R^4$, wherein $A^-$ is an anion selected from the group consisting of $OH^-$, $NO_3^-$, $SO_4^-$, $Cl^-$, and $Br^-$; M is selected from the group consisting of N, S and P; $R^1$, $R^2$, $R^3$, and $R^4$ are independently selected from the group consisting of hydrogen, alkyl, and allyl groups, the alkyl, allyl, and aryl groups having 1 to 40 carbon atoms; Py is pyridinium or an alkyl substituted pyridinium group in which the alkyl group has 1 to 30 carbon atoms;

wherein the onium salt is present in an amount ranging from about 10 wt % to about 1000 wt % based on the weight of the layered mineral, and wherein the amount of layered mineral ranges from about 0.1 wt % to about 40 wt % based on the weight of the composition.

* * * * *